United States Patent [19]
Veltri et al.

[11] Patent Number: 4,610,896
[45] Date of Patent: Sep. 9, 1986

[54] METHOD FOR REPAIRING A MULTILAYER COATING ON A CARBON-CARBON COMPOSITE

[75] Inventors: Richard D. Veltri, East Hartford; Francis S. Galasso, Manchester, both of Conn.

[73] Assignee: United Technologies Corporation, Hartford, Conn.

[21] Appl. No.: 721,248

[22] Filed: Apr. 8, 1985

[51] Int. Cl.$^4$ ............................................. B32B 35/00
[52] U.S. Cl. .................... 427/140; 427/249; 427/255.2; 427/419.7
[58] Field of Search ............... 427/249, 255.2, 255.7, 427/140, 419.7

[56] References Cited

U.S. PATENT DOCUMENTS

| | | | |
|---|---|---|---|
| 3,798,061 | 3/1974 | Yamazaki | 427/255.2 |
| 4,472,476 | 9/1984 | Veltri et al. | 427/249 |
| 4,501,777 | 2/1985 | Rose | 427/255.2 |

FOREIGN PATENT DOCUMENTS 54-155211 12/1979 Japan ........................... 427/255.2

*Primary Examiner*—Sadie L. Childs
*Attorney, Agent, or Firm*—A. Dean Olson

[57] ABSTRACT

A method for repairing a multilayer coating on a carbon-carbon composite having a CVD silicon nitride outercoating by applying a coating of CVD silicon nitride. It has been found that if a multilayer coating containing CVD silicon nitride on a carbon-carbon composite is broken the entire composite will fail to survive at elevated temperatures due to oxidation. However, the deposition of silicon nitride on such a composite will affect repair such that the newly coated composite will substantially resist oxidation at temperatures up to 1750° C. and above. Preferably the coated composite is maintained at a temperature of about 1500° C. and a gaseous mixture containing silicon tetrafluoride and anhydrous ammonia is passed over the composite at a partial pressure of the reactant gases less than about 10 millimeters mercury.

3 Claims, No Drawings

METHOD FOR REPAIRING A MULTILAYER COATING ON A CARBON-CARBON COMPOSITE

DESCRIPTION

1. Technical Field

This invention concerns coatings for carbon-carbon composite materials, and particularly methods for the repair of multilayer coatings.

2. Background Art

Carbon-carbon composites are a class of unique materials whose properties, especially at elevated temperatures, make them attractive for various aerospace applications. The materials are composites although all of the composite elements are comprised essentially of carbon, in its various allotropic forms. Carbon-carbon materials are produced starting with organic precursor fibers such as polyacrylonitrile, rayon or pitch. Such fibers are usually produced in bundles (yarn), often by an extrusion process. The precursor fibers are heated in an inert atmosphere to pyrolyze or carbonize them and may then be heated to a higher temperature (e.g. 2204 degrees centigrade (°C) to form graphite fibers. These carbon or graphite materials may then be laid down, woven, or interleaved to form what are referred to as 1D, 2D, 3D, etc. structures where D stands for direction (i.e. in a 2D structure fibers are laid in two, usually orthogonal, directions).

These woven structures can then be impregnated with a pitch or resin material which is converted to carbon and then graphite. In this process, hot pressing is sometimes employed to obtain a dense structure. Repeated impregnation steps can be employed to increase density.

An alternative processing scheme is to use chemical vapor deposition (CVD) to deposit pyrolytic graphite on the woven structures to densify the structure.

The finished product is over 90% carbon, but by virtue of the fiber alignment and other processing details such as densification, has exceptional mechanical properties when compared with other carbon type materials. The mechanical properties are constant, or even increase slightly, with increase in temperature up to about 2204° C. This temperature capability makes carbon-carbon materials exceptionally attractive for various aerospace applications including gas turbine engines. The obvious drawback is the susceptibility of carbon-carbon materials to oxidation.

There are several coatings that have been applied to carbon-carbon composites in carbon based materials to protect them from oxidation. For instance, silicon carbide conversion coatings and pack coating processes are popular. Commonly assigned U.S. Pat. No. 4,472,476 issued Sept. 18, 1984 to Frank S. Galasso and Richard D. Veltri, the disclosure of which is incorporated by reference, describes a multiple layer coating for the protection of carbon based substrates. In that patent, a pack derived silicon carbide coating is applied to the surface of a carbon-carbon substrate. Pack derived coatings are formed by embedding an article in a pack material which produces the desired coating vapors when heated. A CVD applied layer of silicon nitride is then applied to the pack derived silicon carbide coating. Optionally, a layer of pyrolytic graphite or a layer of CVD applied silicon carbide is applied between the carbon-carbon composite surface and the pack derived silicon carbide coating. That invention provides virtual immunity to oxidation of temperatures up to 1371° C., even after exposure for more than 500 hours. These coatings perform well, however, given the importance of carbon-carbon composites to the aerospace industry, there is always room for improvement in this field of technology.

Accordingly, there is a constant search in this art for new oxidative resistant coating technology for carbon composites.

DISCLOSURE OF INVENTION

This invention is directed to a method for repairing oxidative resistant silicon carbide-silicon nitride multilayer coatings for carbon-carbon composites. A gaseous mixture comprising silicon halide or silane and anhydrous ammonia or nitrogen is passed over a multilayer coated carbon-carbon composite coated with, a pack derived silicon carbide coating bonded to the substrate surface having a thickness of from about 0.04 mil to about 30 mils and a CVD applied layer of silicon nitride on the outer surface of the silicon carbide layer having a thickness of from about 3 mils to about 30 mils. The coated composite is maintained at about 1200° C. to about 1900° C. and an absolute pressure of less than about 200 millimeters of mercury while the gas mixture is passed over it. The repaired multilayer coating is made essentially resistant to oxidation at temperatures up to 1750° C.

This invention provides a significant advancement to carbon-carbon composite coating technology. It has been found that is the multilayer coating described above is discontinuous (e.g. it has broken), the entire composite will fail to survive elevated temperatures due to oxidation. Surprisingly, although a break may occur in the multilayer coating exposing the carbon-carbon composite surface, it is only necessary to apply the final coating (CVD silicon nitride) to affect repair of the multilayer carbon-carbon composite coating. This discovery facilitates the use of carbon-carbon composite technology in various aerospace applications including gas turbine engines by providing repair techniques for oxidation resistant coatings.

The foregoing and other features and advantages of the present invention, will become more apparent from the following description.

BEST MODE FOR CARRYING OUT THE INVENTION

Any silicon and nitrogen containing compound or mixture, when used as a coating, which provides oxidative resistance at elevated temperatures to a coated carbon-carbon composite may be used to repair oxidative resistant coating for carbon-carbon components. It is preferable to use a mixture of two gases to repair the coatings. One gas is silicon halide and it is especially preferred that the gas is silicon tetrafluoride. However, silane compounds may also be used in the practice of this invention. Silane compounds are gaseous or liquid compounds of silicon and hydrogen that have the formula ($Si_nH_{2n+2}$). The other gas is typically anhydrous ammonia, however, nitrogen may also be used in the practice of this invention. The mole percent of nitrogen containing gases in the gas stream may be varied. Preferably, the mole percent of nitrogen containing gases in the gas stream based on the reactive gases is about 50% to about 85%. It is especially preferred that the gas mixture contains about 75% ammonia or nitrogen.

This gas mixture is applied to a coated carbon-carbon composite by any process suitable for depositing a layer of silicon nitride on the coated carbon-carbon composite surface, preferably a CVD process. Note commonly assigned U.S. Pat. No. 3,226,194, the disclosure of which is incorporated by reference. The carbon-carbon composite coating surface should be maintained at a temperature of about 1200° C. to about 1900° C. While the silicon tretrafluoride-ammonia reaction is best performed at 1400° C. to 1600° C. the reaction of silane with nitrogen containing gases can be run at lower temperatures. The reaction is best carried out at low pressures. Absolute pressures of less than about 200 millimeters mercury are preferred. Optimum results are obtained at absolute pressures of less than 20 millimeters of mercury or between about 1 and 10 millimeters of mercury. A carrier gas may be employed, and the reaction conducted at ordinary atmospheric pressure or even super atmospheric pressure. Suitable carrier gases include nitrogen and the noble gases, such as neon, krypton, argon and the like. Regardless of whether reactant gases or carrier gases with reactant gases are employed the combined partial pressure of reactive gases in contact with the hot surface should be less than about 200 millimeters of mercury and preferably the combined partial pressure of the reactant gases should be less than 10 millimeters of mercury, or between about 1 and 10 millimeters of mercury to obtain a high density crystalline structure.

Although the reaction can be carried out at higher pressures, e.g. up to atmospheric and even above, use of higher pressures may result in reaction in the gaseous phase away from the hot surface. Such reaction may lead to formation of solid reaction products in the atmosphere surrounding the hot surface which clog the equipment and hamper operation. Reaction away from the hot surface may also lead to a low yield of the desirable deposited silicon nitride.

The rate of deposition of pyrolytic silicon nitride on the hot surface has been found to increase with temperature. The rate of deposition is dependent on pressure and concentration of reactant gases as well as temperature. The rate will vary with these parameters according to standard chemical principles, i.e. an increase in temperature increases the rate of reaction. Varying these conditions permits good control of the rate.

The mixture of gases applied to the carbon-carbon composite over a period sufficient to deposit a layer approximately 2 mils to 10 mils preferably about 3 mils. Surprisingly, it has been found that a six hour exposure to the gaseous mixture is normally sufficient to repair a coating that was originally applied over a period of four six-hour runs. The coating has an α silicon nitride crystalline structure.

This coating repair method may be used for any carbon-carbon composite that has a coating of silicon nitride or a multilayer coating whose outer coating layer is silicon nitride. Thus, coatings that are, for example, broken or fractured and thus have discontinuities can be repaired. A discontinuity in the coating refers to a lack of continuity or a gap or break in the coating. It is particularly useful for repairing coatings such as are described in U.S. Pat. No. 4,472,476. In that patent, multiple layer coatings are described that provide oxidation resistance to carbon based substrates. The first or inner layer is a silicon carbide pack layer produced by diffusing silicon into the carbon based substrate. This layer as a thickness of from about 0.04 mil to about 30 mils. A second outer layer is silicon nitride having a thickness of from about 5 mils to about 25 mils and is typically applied by chemical vapor deposition. An optional layer of pyrolytic graphite having a thickness of from about 1 mil to about 5 mils, or a layer of CVD applied silicon carbide having a thickness of from about 0.5 mil to about 5 mils may be applied to the carbon-carbon composite surface underneath the above described first layer of pack derived silicon carbide.

EXAMPLE I

A sample of a carbon-carbon material such as type G2206 manufactured by the Hitco Corporation of Gardenia, Calif. had been coated for oxidation protection in a manner described in commonly assigned U.S. Pat. No. 4,472,476 entitled "Composite Silicon Carbide/Silicon Nitride Coatings for Carbon-Carbon Materials" by Veltri and Galasso. Due to a support fixture failure, a large area was damaged in the multilayer coating. This area encompassed approximately 25% of the surface of one side of a rectangular shaped sample.

A repair coating 12 to 14 mils thick of chemically vapor deposited silicon nitride was applied to this damaged piece. For this repair procedure the sample was placed in a reactor which in turn was placed within a high temperature furnace. The furnace was heated such that the temperature within the reactor was 1450° C. With large mechanical pumps and the proper valves, pressure within the reactor was maintained at less than 2 torr. When the temperature of the reactor and the absolute pressure had stabilized at the desired level, the gases of silicon tetrafluoride and ammonia were introduced. The flow rates were 60 cubic centimeters per minute (cc/min) of silicon tetrafluoride and 450 cc/min of ammonia. This amount of gas flow to the hot reactor was maintained for four hours. After shutoff of the reactant gases and allowing time for the furnace to cool to room temperature, the reactor was opened and the sample repositioned for the next coating. The entire operating procedure was then repeated. These two runs yielded coating thicknesses of 12 to 14 mils. Oxidative testing of the repaired sample is included in the table below.

Table I below details oxidation resistance studies for a carbon-carbon composite sample which lost a large surface area of the silicon nitride coating due to support fixture failure, but was repaired according to the above procedure. The insignificant weight change is indicative of the superior oxidation resistance. Since the high and low temperatures normally result in greater oxidation, the sample was only held for short time periods at intermediate temperatures. It is believed that greater oxidation occurs at high and low temperatures because at high temperatures silicon nitride disassociates and at low temperatures not enough oxide is formed to seal any cracks.

TABLE I

| Temp °C. | Time (Hours) | Total Weight % Change |
|---|---|---|
| 527 | 150 | +.01 |
| 1371 | 0.25 | −.003 |
| 1538 | 0.25 | +.012 |
| 1704 | 10 | +.02 |

This invention provides a procedure for repairing coatings for carbon-carbon composites that resist oxidation when exposed to temperatures up to 1700° C. and above. It is particularly surprising that this repair procedure works, because even though a break may have occurred through a multiple layer coating, such that the carbon-carbon composite surface is exposed, a coating of silicon nitride provides excellent oxidative resistance. In addition, a large surface discontinuity may be repaired as evidenced by the above example. Although not understood, it is believed that this occurs because there is a compliant layer over most of the surface under the CVD silicon nitride.

This invention provides a significant advance to carbon-carbon technology. This discovery can be used to repair oxidative resistant coating for carbon-carbon composites that may be used in a variety of applications, particularly in the aerospace industry. For example, in jet engine production lines, this coating repair procedure could be utilized to eliminate scrap. Coated composites that do not meet specification because of breaks in their coatings can be repaired. Breaks can occur for a variety of reasons during production such as sticking to support fixtures or post-mechanical handling. In addition, this process may be used for carbon-carbon composites whose coatings are damaged in use. Thus, a relatively easy method has been found to repair coating that have been broken due to handling or wear. This helps facilitate the use of carbon-carbon composite technology in the aerospace industries.

The invention in its broader aspects is not limited to specific details described, but departures may be made from such details within the scope of the accompanying claims without departing from the process of the invention or without sacrificing its chief advantages.

We claim:

1. A method of repairing a discontinuous multilayer silicon carbide-silicon nitride coating on a carbon-carbon composite comprising maintaining the coated carbon-carbon composite at about 1200° C. to about 1900° C. and an absolute pressure of less than about 200 millimeters of mercury while passing a gaseous mixture comprising silicon halide or silane and anhydrous ammonia or nitrogen over the coated composite, wherein the multilayer coating comprises a pack derived silicon carbide coating bonded to the carbon-carbon composite having a thickness of from about 0.04 mil to about 30 mils and a chemical vapor deposition applied layer of silicon nitride on the outer surface of the silicon carbide layer having a thickness of from about 3 mils to about 30 mils, whereby the thus repaired multilayer coating is essentially resistant to oxidation at temperatures up to 1750° C.

2. The method as recited in claim 1 wherein the silicon carbide coating is bonded to the carbon-carbon composite through an additional layer of pyrolytic graphite having a thickness of from about 1 mil to about 5 mils.

3. The method as recited in claim 1 wherein the silicon carbide coating is bonded to the carbon-carbon composite through an additional layer of chemical vapor deposition applied silicon carbide having a thickness of from about 0.5 mil to about 5 mils.

* * * * *